(12) United States Patent
Krok et al.

(10) Patent No.: US 8,342,010 B2
(45) Date of Patent: Jan. 1, 2013

(54) SURGE PRECURSOR PROTECTION SYSTEMS AND METHODS

(75) Inventors: Michael Krok, Clifton Park, NY (US); John Bolton, Lake Luzerne, NY (US)

(73) Assignee: General Electric Corporation, Niskayuna, NY (US)

( * ) Notice: Subject to any disclaimer, the term of this patent is extended or adjusted under 35 U.S.C. 154(b) by 4 days.

(21) Appl. No.: 12/957,626

(22) Filed: Dec. 1, 2010

(65) Prior Publication Data

US 2012/0137759 A1    Jun. 7, 2012

(51) Int. Cl.
*G01M 15/14* (2006.01)

(52) U.S. Cl. .................................................. 73/112.06

(58) Field of Classification Search ............... 73/112.01, 73/112.03, 112.06, 112.05
See application file for complete search history.

(56) References Cited

U.S. PATENT DOCUMENTS

| | | | |
|---|---|---|---|
| 6,532,433 B2 | 3/2003 | Bharadwaj et al. | |
| 6,536,284 B2 | 3/2003 | Bonanni | |
| 7,003,426 B2 | 2/2006 | Bonanni et al. | |
| 7,596,953 B2 | 10/2009 | Krok et al. | |
| 7,650,777 B1 | 1/2010 | Krok et al. | |
| 7,677,090 B2 * | 3/2010 | Moen | 73/112.06 |
| 2002/0184951 A1 | 12/2002 | Bonanni | |
| 2004/0068387 A1 | 4/2004 | Bonanni et al. | |
| 2006/0161550 A1 | 7/2006 | Carini et al. | |
| 2009/0019925 A1 * | 1/2009 | Moen | 73/112.06 |

* cited by examiner

*Primary Examiner* — Eric S McCall
(74) *Attorney, Agent, or Firm* — Ann M. Agosti

(57) ABSTRACT

The present application provides a method of monitoring a compressor. The method may include the steps of determining a blade passing frequency, determining a power indication for a number of frequencies above and below the blade passing frequency, determining a ratio between a maximum power indication and a minimum power indication for the frequencies for a number of predetermined time intervals, and analyzing the ratio for each predetermined time interval to predict a surge condition of the compressor.

20 Claims, 3 Drawing Sheets

SURGE PRECURSOR PROTECTION SYSTEMS AND METHODS

TECHNICAL FIELD

The present application relates generally to gas turbine engines and the like and more particularly relates to systems and methods for surge precursor detection and protection in a compressor by the measurement of power changes near the blade passing frequency.

BACKGROUND OF THE INVENTION

The compressor pressure ratio of a gas turbine engine generally is set at a pre-specified margin away from the surge/stall boundary (referred to as a surge margin or a stall margin), to avoid unstable compressor operation. In gas turbine engines used for power generation and other purposes, higher system efficiencies generally require higher compressor pressure ratios. Such higher pressure ratios, however, may necessitate a reduction in the operating surge/stall margin and hence a reduction in the response time if surge or stall conditions begin to develop.

One approach to compressor surge or stall detection is to monitor the health of the compressor by measuring the airflow and the pressure rise through the compressor. These pressure variations may be attributed to a number of different causes such as, for example, unstable combustion, rotating stall, and surge events on the compressor itself. To determine these pressure variations, the magnitude and rate of change of the pressure rise through the compressor may be monitored. This approach, however, does not offer prediction capabilities of rotating stall or surge. Moreover, this approach may fail to offer information in real-time to a control system with sufficient lead time to deal proactively with such events.

There is thus a desire for improved systems and methods for surge event precursor detection and protection. Such system and methods may determine a measure of surge likelihood in the compressor before an actual surge event itself with sufficient lead time to respond adequately so as to avoid damage thereto.

SUMMARY OF THE INVENTION

The present application thus provides a method of monitoring a compressor. The method may include the steps of determining a blade passing frequency, determining a power indication for a number of frequencies above and below the blade passing frequency, determining a ratio between a maximum power indication and a minimum power indication for the frequencies for a number of predetermined time intervals, and analyzing the ratio for each predetermined time interval to predict a surge condition of the compressor.

The present application further provides a compressor system. The system may include a speed sensor for obtaining a speed signal of a rotor, a pressure sensor for obtaining a number of dynamic pressure signals, and a controller configured to determine a blade passing frequency from the speed signal and to determine a surge indication signal based upon the dynamic power signals for a number of frequencies above and below the blade passing frequency.

The present application further provides a method of monitoring a compressor for surge conditions therein. The method may include the steps of determining a blade passing frequency based upon a rotor speed signal, determining a power indication for a number of frequencies above and below the blade passing frequency based upon a number of dynamic pressure signals, determining a ratio between a maximum power indication and a minimum power indication for the frequencies for a predetermined time interval, analyzing the ratio for each predetermined time interval to predict a surge condition of the compressor, and providing a surge indication signal to the compressor.

These and other features and improvements of the present application will become apparent to one of ordinary skill in the art upon review of the following detailed description when taken in conjunction with the several drawings and the appended claims.

DETAILED DESCRIPTION

Generally described, a highly efficient gas turbine engine produces high electrical power output at a relatively low cost. The compressor in such a highly efficient gas turbine engine thus may be operated to produce a cycle pressure ratio that corresponds to a high firing temperature. As described above, the compressor may experience aerodynamic instabilities, such as, for example, stall and/or surge conditions, as the compressor is used to produce the high firing temperature or the high cycle pressure ratio. A compressor experiencing such stall and/or surge conditions may cause problems that may impact the components and the operational efficiency of the compressor and the overall gas turbine engine.

Figure 1:
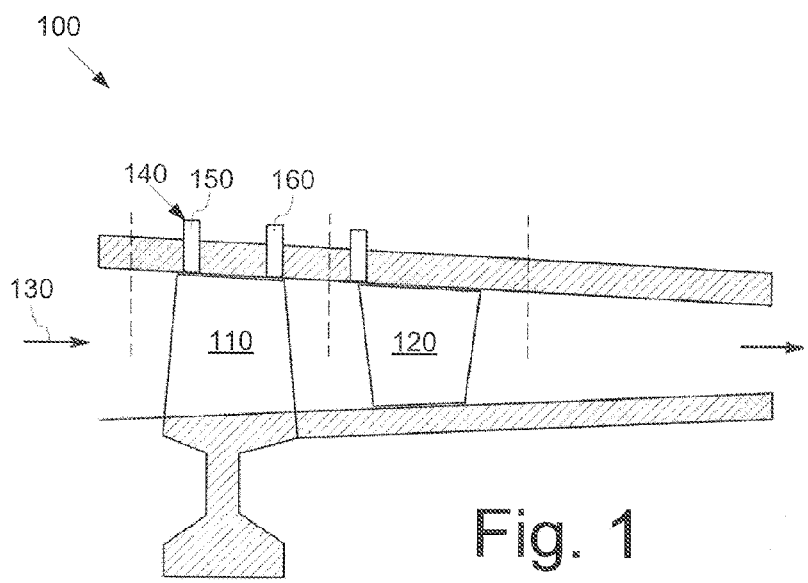
FIG. 1 is a cross-sectional view of a portion of a known compressor.

Referring now to the drawings, in which like numerals refer to like elements throughout the several views, FIG. 1 shows a portion of a compressor system 100 as may be described herein. The compressor system 100 may include a rotor 110 and a stator 120. A flow of air 130 may be progressively compressed between the rotor 110 and the stator 120. Typically, such compressor systems 100 may use multi-stage compression wherein the stator 120 may be configured to prepare and/or redirect the flow of air 130 from the rotor 110 to a subsequent rotor or to a plenum. Other types of compressor configurations may be used herein.

The compressor system 100 also may include a number of sensors 140 therein. The sensors 140 may sense a number of compressor operating parameters that may be indicative of stall and/or surge conditions. Specifically, the sensors 140 may include, for example, a speed sensor 150 configured to detect the rotational speed of the rotor 110 and a pressure sensor 160 configured to detect pressure dynamically about the rotor 110. Other types of sensors 140 and other types of operating parameters may be used and detected herein.

Figure 2:
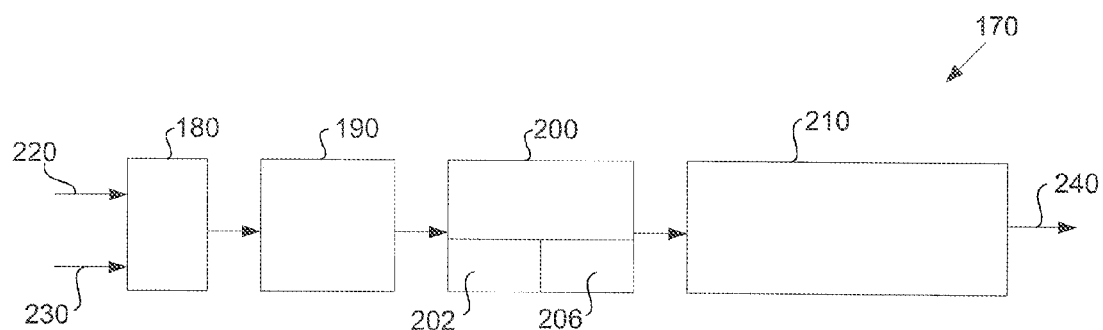
FIG. 2 is a schematic view of a compressor monitoring system as may be described herein.

FIG. 2 shows a compressor controller 170 as may be described herein and as may be used with the compressor system 100. The compressor controller 170 may include a filter 180, a storage medium 190, a signal processor 200, and a surge indicator 210. Other components also may be used herein. The controller 170 may be in communication with the speed sensor 150 to obtain a rotor speed signal 220 and the pressure sensor 160 to obtain a dynamic pressure signal 230. Other types of signals may be used herein.

The filter 180 receives these signals 220, 230 and may be configured to remove undesired components such as, for example, high frequency noise from the sensed parameters. Other types of filtering may be used herein. As will be described in more detail below, buffering (or storing) of the filtered data over a period of time may be performed over a sample rate during a moving window. In one example, the moving window occurs over a period of about eight (8) seconds. Other window lengths may be used herein.

The storage medium 190 may be configured to store the filtered and/or buffered data. The signal processor 200 may be coupled to the storage medium 190 and configured to compute a Fast Fourier Transform analysis of the buffered data so as to determine a likelihood of surge. As will be described in more detail below, the signal processor 200 may include a speed-to-frequency converter 202 to convert the rotor speed signal 220 into a blade passing frequency. The blade passing frequency may be a product of the mechanical speed and the number of rotor blades. The signal processor 200 also may include a root mean square (RMS) converter 206. The RMS converter 206 may compute the root mean square of the dynamic pressure signals 230. The surge indicator 210 may be coupled to the signal processor 200 and configured to generate a surge indication signal 240 in response to the determination of a likelihood of surge. The surge indication signal 240 may be coupled to the overall compressor system 100 for corrective action such as shutdown and other actions in case of a detected likelihood of surge.

Figure 3:
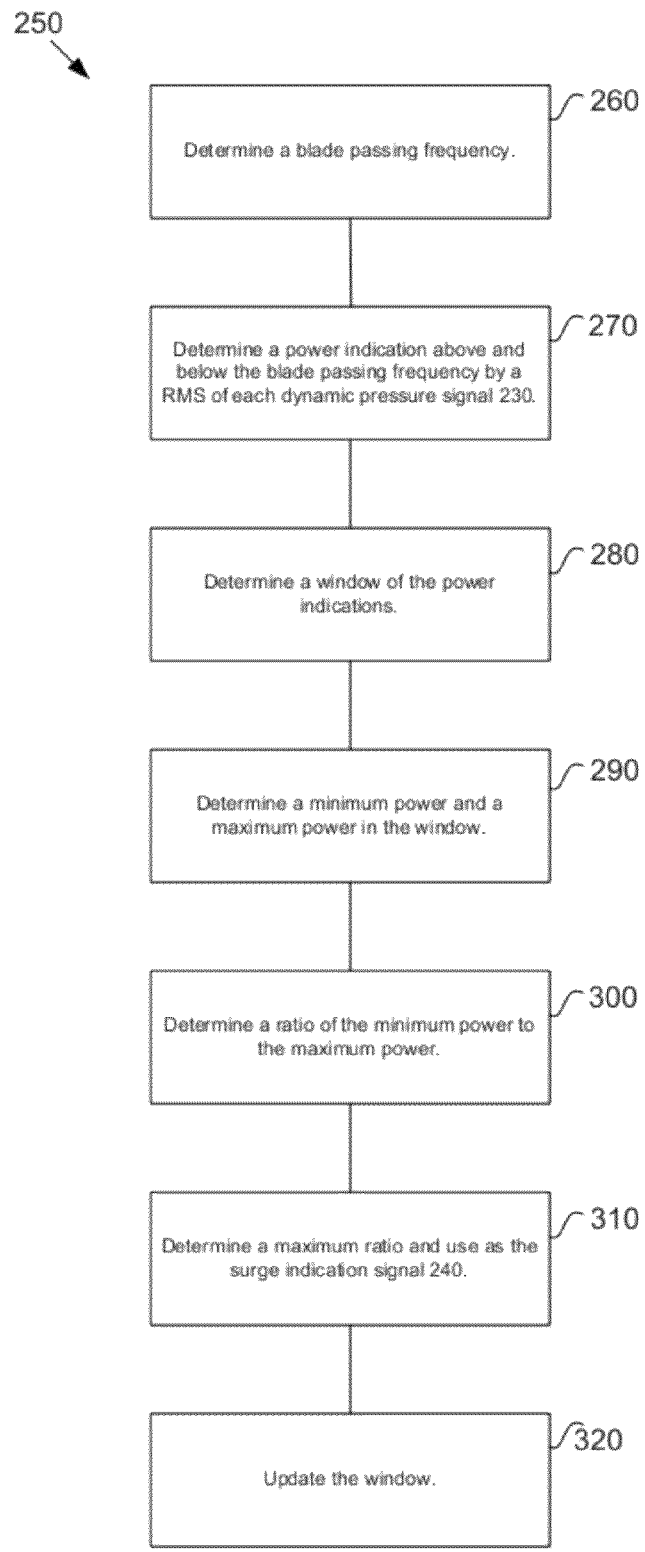
FIG. 3 is a flow chart showing a Fast Fourier Transformation analysis for compressor monitoring as may be described herein.

FIG. 3 shows a flow chart showing a Fast Fourier Transformation analysis 250 that may be used to determine the surge indication signal 240 based, in part, upon the rotor speed signal 220 and the dynamic pressure signals 230, in block 260, the blade passing frequency is determined from the rotor speed signal 220 produced by the speed sensor 150 and converted by the speed-to-frequency converter 202. At block 270, a power indication is determined for the frequency bands above and below the blade passing frequency via the dynamic pressure signals 230. The power indication may be a root mean square of the dynamic pressure signals 230 as determined by the root mean square converter 206. In this example, the power indications may be determined for the frequency bands of about 24 to about 40 hertz above and below the blade passing frequency. Other ranges may be used herein. The power indication in these frequency bands may be monitored about once a second. Other monitoring rates may be used herein.

At block 280, a window of the power indications for each frequency for about eight (8) seconds may be collected. This window thus is an eight (8) second time history of the power in each frequency about the blade passing frequency. At block 290, a minimum power indication and a maximum power indication is determined for each frequency in the window. In block 300, a ratio of the maximum power indication to the minimum power indication is determined for each frequency. At block 310, a maximum ratio of the ratios is determined. Depending upon the magnitude, the maximum ratio thus may serve as the surge indication signal 240. At block 320, the window may be updated at a rate of about once per second. Other update rates may be used.

Figure 4:
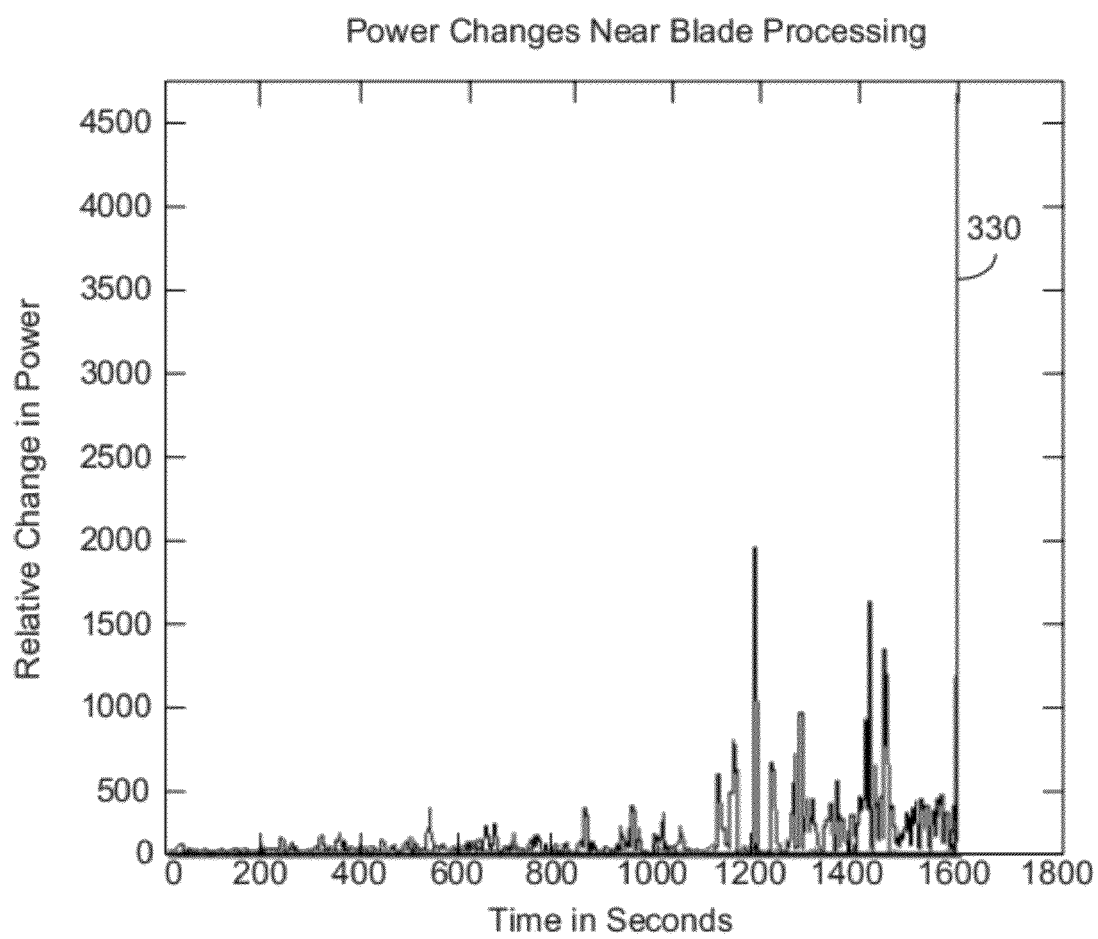
FIG. 4 is a Fast Fourier Transform representation of the power changes near the blade passing frequency.

FIG. 4 shows a representation of the Fast Fourier Transformation analysis 250 of the power changes near the blade passing frequency. At approximately t=1200 seconds, the maximum ratio of the ratios increases substantially on the order of about 50% to 400% from the preceding time period (t=0-1200 seconds). As is shown, the occurrence of the maximum ratio of the ratios becomes more frequent, the stronger the likelihood of surge may exist given the relative changes in power. In addition, the greater the difference in magnitude of the ratios, the stronger the likelihood of surge may exist given the relative changes in power. In this case, a surge 330 takes place at about 1600 seconds where the magnitude of the maximum ratio of the ratios has increase by more than twice that of the preceding the maximum ratio of the ratios of the immediate past 400 seconds. Depending upon the magnitude, one of these spikes (or combinations thereof) may serve as the surge indication signal 240.

The Fast Fourier Transformation analysis 250 thus measures the ability of the controller 170 of the compressor system 100 to maintain a desired speed set point. As a surge condition begins to emerge, the controller 170 may lose the ability to maintain the set point as indicated by the larger changes in the power near the blade passing frequency. The Fast Fourier Transformation analysis 250 thus shows the stability, or the lack thereof, of the compressor system 100. The timely use of surge indication signal 240 therefore may avoid potential compressor damage.

Advantageously, long term Fast Fourier Transform analyses of compressor operational parameters may alleviate shortcomings in present day analysis and operating procedures. Furthermore, Fast Fourier Transform analysis may aid in capturing accurately abnormal pressure perturbations and hence may minimize false pressure surges by way of using scaling factors and the like. Moreover, these aforementioned advantages may help in predicting the onset of surge and/or stall condition accurately, before the compressor surges or stalls, and thus protect the compressor from damage by way of controlling the operating parameters suitably based on the prediction.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A method of monitoring a compressor, comprising:
   determining a blade passing frequency;
   determining a power indication for a plurality of frequencies above and below the blade passing frequency;
   determining a ratio between a maximum power indication and a minimum power indication for the plurality of frequencies in a plurality of predetermined time intervals; and
   analyzing the ratio for each predetermined time interval to predict a surge condition of the compressor.

2. The method of claim 1, wherein the step of determining a blade passing frequency comprises obtaining a rotor speed signal and converting the rotor speed signal to the blade passing frequency.

3. The method of claim 1, wherein the step of determining a power indication comprises obtaining a dynamic pressure signal.

4. The method of claim 3, wherein the step of determining a power indication comprises obtaining a root mean square of the dynamic pressure signal.

5. The method of claim 1, wherein the step of determining a ratio between a maximum power indication and a minimum power indication for the plurality of frequencies for a plurality of predetermined time intervals comprises determining the ratio about once a second and organizing a plurality of ratios into a window.

6. The method of claim 5, wherein the step of organizing the plurality of ratios comprises organizing the plurality of ratios into about an eight (8) second window.

7. The method of claim 5, further comprising the step of updating the window.

8. The method of claim 1, wherein the step of analyzing the ratio for each predetermined time interval to predict a surge condition of the compressor comprises obtaining a plurality of maximum ratios and providing one of the plurality of maximum ratios as a surge indication signal.

9. The method of claim 8, further comprising the step of providing the surge indication signal to the compressor.

10. The method of claim 1, further comprising the step of generating a Fast Fourier Transformation analysis of power changes near the blade passing frequency.

11. A compressor system, comprising:
a speed sensor for obtaining a speed signal of a rotor;
a pressure sensor for obtaining a plurality of dynamic pressure signals; and
a controller configured to determine a surge indication signal based on a blade passing frequency from the speed signal and a power indication signal from the plurality of dynamic pressure signals for a plurality of frequencies above and below the blade passing frequency.

12. The system of claim 11, wherein the controller comprises a filter, a storage medium, and a signal processor.

13. The system of claim 11, wherein the controller comprises a speed-to-frequency converter to convert the speed signal to the blade passing frequency.

14. The system of claim 11, wherein the controller comprises a root mean square converter to convert the plurality of dynamic pressure signals into the power indication signal.

15. The system of claim 14, wherein the controller is configured to determine a ratio between a maximum power indication and a minimum power indication for the plurality of frequencies for a predetermined time interval.

16. The system of claim 15, wherein the controller is configured to select a maximum ratio as the surge indication signal.

17. The system of claim 11, wherein the controller is configured to obtain one of the plurality of dynamic pressure signals about once a second.

18. The system of claim 11, wherein the controller is configured to provide the surge indication signal to the compressor.

19. The system of claim 11, wherein the controller is configured to generate a Fast Fourier Transformation analysis of power changes near the blade passing frequency.

20. A method of monitoring a compressor, comprising:
determining a blade passing frequency based upon a rotor speed signal;
determining a power indication for a plurality of frequencies above and below the blade passing frequency based upon a plurality of dynamic pressure signals;
determining a ratio between a maximum power indication and a minimum power indication for the plurality of frequencies for a predetermined time interval;
analyzing the ratio for each predetermined time interval to predict a surge condition of the compressor; and
providing a surge indication signal to the compressor.

* * * * *